United States Patent
Matsui et al.

(10) Patent No.: US 8,705,251 B2
(45) Date of Patent: Apr. 22, 2014

(54) BIDIRECTIONAL DC/DC CONVERTER AND POWER CONDITIONER

(75) Inventors: Ryoji Matsui, Osaka (JP); Kazuhito Nishimura, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 771 days.

(21) Appl. No.: 12/988,399

(22) PCT Filed: Apr. 8, 2009

(86) PCT No.: PCT/JP2009/057177
§ 371 (c)(1),
(2), (4) Date: Oct. 18, 2010

(87) PCT Pub. No.: WO2009/128373
PCT Pub. Date: Oct. 22, 2009

(65) Prior Publication Data
US 2011/0037319 A1    Feb. 17, 2011

(30) Foreign Application Priority Data
Apr. 18, 2008 (JP) ................................. 2008-109443

(51) Int. Cl.
*H02M 3/335* (2006.01)
(52) U.S. Cl.
USPC .............................................. 363/16; 363/37
(58) Field of Classification Search
USPC ............. 363/15–17, 20–21.18, 24–26, 34, 37
See application file for complete search history.

(56) References Cited

U.S. PATENT DOCUMENTS

| | | | | |
|---|---|---|---|---|
| 7,449,798 B2 * | 11/2008 | Suzuki et al. | | 307/65 |
| 7,599,196 B2 * | 10/2009 | Alexander | | 363/13 |
| 7,638,904 B2 * | 12/2009 | Shoji et al. | | 307/154 |
| 8,467,199 B2 * | 6/2013 | Lee et al. | | 363/21.02 |
| 2006/0139823 A1 | 6/2006 | Shoji et al. | | |
| 2007/0139975 A1 | 6/2007 | Yamauchi et al. | | |
| 2008/0037290 A1 * | 2/2008 | Suzuki et al. | | 363/17 |
| 2008/0309301 A1 | 12/2008 | Shimada et al. | | |

FOREIGN PATENT DOCUMENTS

| | | |
|---|---|---|
| CN | 1988349 A | 6/2007 |
| JP | 01-097163 | 4/1989 |
| JP | 11-008910 | 1/1999 |
| JP | 2000-050402 | 2/2000 |
| JP | 2000-050403 | 2/2000 |

(Continued)

OTHER PUBLICATIONS

International Search Report for PCT/JP2009/057177 mailed, Jul. 14, 2009.

*Primary Examiner* — Jessica Han
(74) *Attorney, Agent, or Firm* — Nixon & Vanderhye, P.C.

(57) ABSTRACT

A bidirectional DC/DC converter includes a bidirectional DC/AC conversion circuit including a push-pull circuit connected between voltage terminals and a winding and having a switching element and a switching element coupled to opposing ends of the winding respectively, and an up-conversion circuit coupled to the push-pull circuit and the voltage terminals, and the up-conversion circuit includes an inductor for allowing passage of a current through the winding, the switching element in an ON state and the switching element in an ON state owing to stored magnetic energy, and a switching element forming a current path going through the voltage terminal, the inductor and the voltage terminal but not through the switching element and the switching element as it is turned on.

10 Claims, 5 Drawing Sheets

(56) References Cited

FOREIGN PATENT DOCUMENTS

| JP | 2001-037226 | 2/2001 |
| JP | 2001-211645 | 8/2001 |
| JP | 2002-165448 | 6/2002 |
| JP | 2006-187147 | 7/2006 |
| JP | 2007-288876 | 11/2007 |

* cited by examiner

US 8,705,251 B2

BIDIRECTIONAL DC/DC CONVERTER AND POWER CONDITIONER

This application is the U.S. national phase of International Application No. PCT/JP2009/057177, filed 8 Apr. 2009, which designated the U.S. and claims priority to Japanese Application No. 2008-109443, filed 18 Apr. 2008, the entire contents of each of which are hereby incorporated by reference.

TECHNICAL FIELD

The present invention relates to a bidirectional DC/DC converter and a power conditioner for bidirectionally transmitting and receiving DC power.

BACKGROUND ART

In bidirectionally transmitting and receiving DC power such as charging and discharging of a storage battery, a bidirectional DC/DC converter has been required and a large number of such bidirectional DC/DC converters have also been developed so far.

For example, Japanese Patent Laying-Open No. 2002-165448 (Patent Document 1) discloses an isolation-type bidirectional DC/DC converter as below. Namely, in FIG. 1 of Patent Document 1, down-converted power feed from a main battery 1 to an auxiliary machinery battery 5 is achieved as follows. As a pair of NMOS transistors 211 and 214 and a pair of NMOS transistors 212 and 213 are alternately turned on in a prescribed cycle, a single-phase rectangular wave AC voltage is generated. This single-phase rectangular wave AC voltage is down-converted by a transformer 3, the resultant voltage is subjected to single-phase full-wave rectification by a switching & rectification unit 41 and smoothening by a secondary-side smoothing circuit 42, and the resultant voltage is applied to auxiliary machinery battery 5. Meanwhile, up-converted power feed from auxiliary machinery battery 5 to main battery 1 is achieved as follows. By turning on both of NMOS transistors 411 and 412 of switching & rectification unit 41, magnetic energy is stored in a choke coil 421. Then, NMOS transistor 41 is turned off. Thus, an output voltage from auxiliary machinery battery 5 is up-converted through NMOS transistor 412 so that an AC voltage component is generated in a primary coil of transformer 3. Then, this AC voltage component is subjected to full-wave rectification by a flywheel diode D of a single-phase inverter circuit 21 and smoothing by a primary-side smoothing circuit 22, whereby main battery 1 is charged.

PRIOR ART DOCUMENTS

Patent Documents

Patent Document 1: Japanese Patent Laying-Open No. 2002-165448

SUMMARY OF THE INVENTION

Problems to be Solved by the Invention

In the bidirectional DC/DC converter described in Patent Document 1, switching elements 411 and 412 are turned on while a voltage up-converted as a result of storage of magnetic energy in choke coil 421 and additionally a voltage applied to auxiliary machinery battery 5 with each element being in an OFF state are applied. In addition, since switching elements 411 and 412 should be turned off while both of switching elements 411 and 412 are ON and a current flows through switching elements 411 and 412, load imposed on switching elements 411 and 412 at the moment when they are turned off is high. In particular in a power conditioner interconnected to a power system in supply and reception of electric power to/from a solar cell and a storage battery, a voltage from the power system is AC 200 V. Therefore, in the bidirectional DC/DC converter described in Patent Document 1, a transient voltage applied to switching elements 411 and 412 becomes great and a switching element having a high withstand voltage should inevitably be selected. In general, the higher the withstand voltage is, the greater an ON resistance of the switching element is. As the ON resistance increases, lowering in efficiency of the bidirectional DC/DC converter and increase in size of a heat sink for waste heat disposal of the switching element give rise to a problem.

The present invention was made to solve the above-described problems, and an object of the present invention is to provide a bidirectional DC/DC converter capable of achieving lower loss in a switching element and allowing use of a switching element low in withstand voltage as well as a power conditioner.

Means for Solving the Problems

In order to solve the problem above, a bidirectional DC/DC converter according to one aspect of the present invention is a bidirectional DC/DC converter including a first voltage terminal to a fourth voltage terminal and performing a forward-direction operation for converting a DC voltage applied to the first voltage terminal and a second voltage terminal to a prescribed DC voltage and supplying the DC voltage to a third voltage terminal and the fourth voltage terminal and a reverse-direction operation for converting a DC voltage applied to the third voltage terminal and the fourth voltage terminal to a prescribed DC voltage and supplying the DC voltage to the first voltage terminal and the second voltage terminal, which includes: an isolation transformer including a first winding and a second winding; a first bidirectional DC/AC conversion circuit connected between the first voltage terminal, the second voltage terminal and the first winding, for converting the DC voltage applied to the first voltage terminal and the second voltage terminal to an AC voltage and outputting the AC voltage to the first winding in the forward-direction operation and rectifying and smoothing an AC voltage induced in the first winding and outputting the AC voltage to the first voltage terminal and the second voltage terminal in the reverse-direction operation; and a second bidirectional DC/AC conversion circuit connected between the third voltage terminal, the fourth voltage terminal and the second winding, for rectifying and smoothing an AC voltage induced in the second winding and outputting the AC voltage to the third voltage terminal and the fourth voltage terminal in the forward-direction operation and converting the DC voltage applied to the third voltage terminal and the fourth voltage terminal to an AC voltage and outputting the AC voltage to the second winding in the reverse-direction operation; the second bidirectional DC/AC conversion circuit includes a push-pull circuit including a first switching element and a second switching element coupled to opposing ends of the second winding respectively, and an up-conversion circuit coupled to the push-pull circuit, the third voltage terminal and the fourth voltage terminal, and the up-conversion circuit includes an inductor for allowing passage of a current through the second winding, the first switching element in an ON state and the second switching element in an ON state owing to stored magnetic energy, and a third switching element forming a current path going through the third voltage terminal, the inductor and the fourth voltage terminal but not through the first switching element and the second switching element as it is turned on.

Preferably, the inductor has a first end connected to a portion other than the opposing ends of the second winding and a second end connected to the third voltage terminal, the first switching element has a first end connected to a first end of the second winding and a second end connected to the fourth voltage terminal, the second switching element has a first end connected to a second end of the second winding and a second end connected to the fourth voltage terminal, and the third switching element has a first end connected to the first end of the inductor and a second end connected to the fourth voltage terminal.

Preferably, the first bidirectional DC/AC conversion circuit includes a half-bridge circuit.

Preferably, the first bidirectional DC/AC conversion circuit includes a fourth switching element having a body diode and connected between a first end of the first winding and the first voltage terminal, and a fifth switching element having a body diode and connected in parallel to the fourth switching element, between the first end of the first winding and the second voltage terminal, and in the forward-direction operation, the fourth switching element and the fifth switching element are turned on and off, in the reverse-direction operation, the fourth switching element and the fifth switching element are both turned off, and a current induced in the first winding is rectified by the body diode of the fourth switching element and the body diode of the fifth switching element.

Preferably, the first switching element and the second switching element each have a body diode, and in the reverse-direction operation, the first switching element and the second switching element are turned on and off, in the forward-direction operation, the first switching element and the second switching element are both turned off, and a current induced in the second winding is rectified by the body diode of the first switching element and the body diode of the second switching element.

Preferably, a secondary battery is coupled to the third voltage terminal and the fourth voltage terminal.

Preferably, the second bidirectional DC/AC conversion circuit further includes a smoothing capacitor connected between the third voltage terminal and the fourth voltage terminal, and the bidirectional DC/DC converter further includes an inrush current prevention circuit connected between the smoothing capacitor, the inductor and the third voltage terminal, for preventing an inrush current by the DC voltage applied to the third voltage terminal and the fourth voltage terminal.

In order to solve the problem above, a power conditioner according to one aspect of the present invention is a power conditioner coupled to a DC power source, a power storage device and a power system, interconnected to the power system, and supplying electric power to a load, which includes: a unidirectional DC/DC converter for converting a DC voltage received from the DC power source to a prescribed DC voltage and outputting the DC voltage; a bidirectional DC/DC converter for performing a forward-direction operation for converting a DC voltage received from the unidirectional DC/DC converter to a prescribed DC voltage and supplying the DC voltage to the power storage device during charging of the power storage device and performing a reverse-direction operation for converting a DC voltage received from the power storage device to a prescribed DC voltage and supplying the DC voltage to an inverter during discharging of the power storage device; and an inverter for converting a DC voltage received from the unidirectional DC/DC converter and the bidirectional DC/DC converter to an AC voltage and supplying the AC voltage to the load; the bidirectional DC/DC converter includes an isolation transformer including a first winding and a second winding, a first bidirectional DC/AC conversion circuit connected between the unidirectional DC/DC converter, the inverter and the first winding, for converting the DC voltage received from the unidirectional DC/DC converter to an AC voltage and outputting the AC voltage to the first winding in the forward-direction operation and rectifying and smoothing an AC voltage induced in the first winding and outputting the AC voltage to the inverter in the reverse-direction operation, and a second bidirectional DC/AC conversion circuit connected between the power storage device and the second winding, for rectifying and smoothing an AC voltage induced in the second winding and outputting the AC voltage to the power storage device in the forward-direction operation and converting the DC voltage received from the power storage device to an AC voltage and outputting the AC voltage to the second winding in the reverse-direction operation, the second bidirectional DC/AC conversion circuit includes a push-pull circuit including a first switching element and a second switching element coupled to opposing ends of the second winding respectively, and an up-conversion circuit coupled to the push-pull circuit and the power storage device, and the up-conversion circuit includes an inductor for allowing passage of a current through the second winding, the first switching element in an ON state and the second switching element in an ON state owing to stored magnetic energy, and a third switching element forming a current path going through the power storage device and the inductor but not through the first switching element and the second switching element as it is turned on.

Effects of the Invention

According to the present invention, loss in a switching element can be lowered and a switching element low in withstand voltage can be used.

MODES FOR CARRYING OUT THE INVENTION

Figure 1:
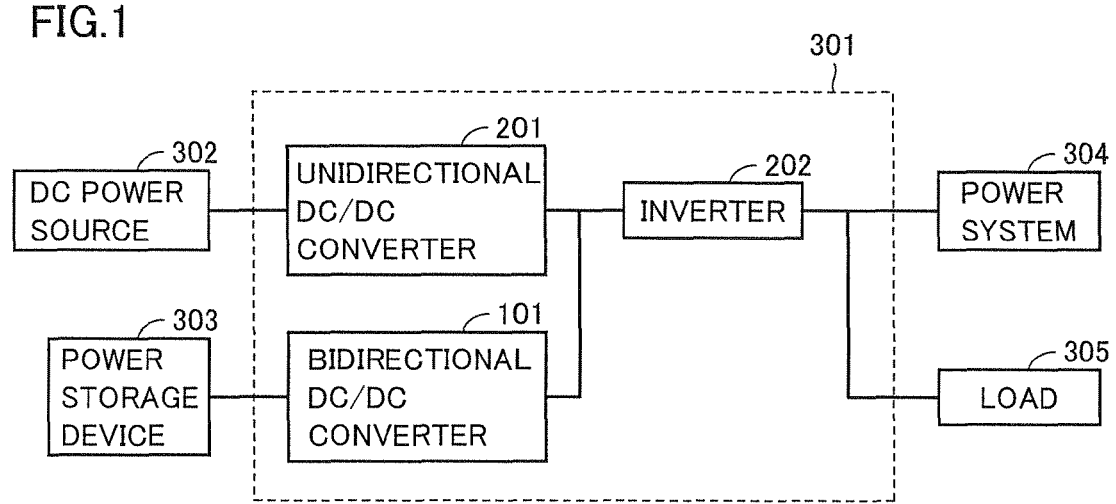
FIG. 1 is a diagram showing a configuration of a power conditioner according to a first embodiment of the present invention.

An embodiment of the present invention will be described hereinafter with reference to the drawings. In the drawings, the same or corresponding elements have the same reference characters allotted and description thereof will not be repeated.

First Embodiment

[Configuration and Basic Operation]

FIG. 1 is a diagram showing a configuration of a power conditioner according to a first embodiment of the present invention.

Referring to FIG. 1, a power conditioner 301 includes a bidirectional DC/DC converter 101, a unidirectional DC/DC converter 201, and an inverter 202. Power conditioner 301 is interconnected to a power system 304.

During charging of power storage device 303, bidirectional DC/DC converter 101, for example, down-converts a DC voltage received from unidirectional DC/DC converter 201 and outputs the DC voltage to power storage device 303. During discharging of power storage device 303, bidirectional DC/DC converter 101, for example, up-converts a DC voltage received from power storage device 303 and outputs the DC voltage to inverter 202.

Unidirectional DC/DC converter 201 converts a DC voltage supplied from a DC power source 302 to a prescribed DC voltage and outputs the DC voltage to inverter 202. Inverter 202 converts the DC voltage received from unidirectional DC/DC converter 201 and bidirectional DC/DC converter 101 to an AC voltage and supplies the AC voltage to a load 305. In addition, power system 304 supplies an AC voltage to load 305 through power conditioner 301. It is noted that power conditioner 301 may be configured to perform reverse power flow. Namely, the configuration may be such that inverter 202 converts a DC voltage received from unidirectional DC/DC converter 201 and bidirectional DC/DC converter 101 to an AC voltage and supplies the AC voltage to power system 304.

Figure 2:
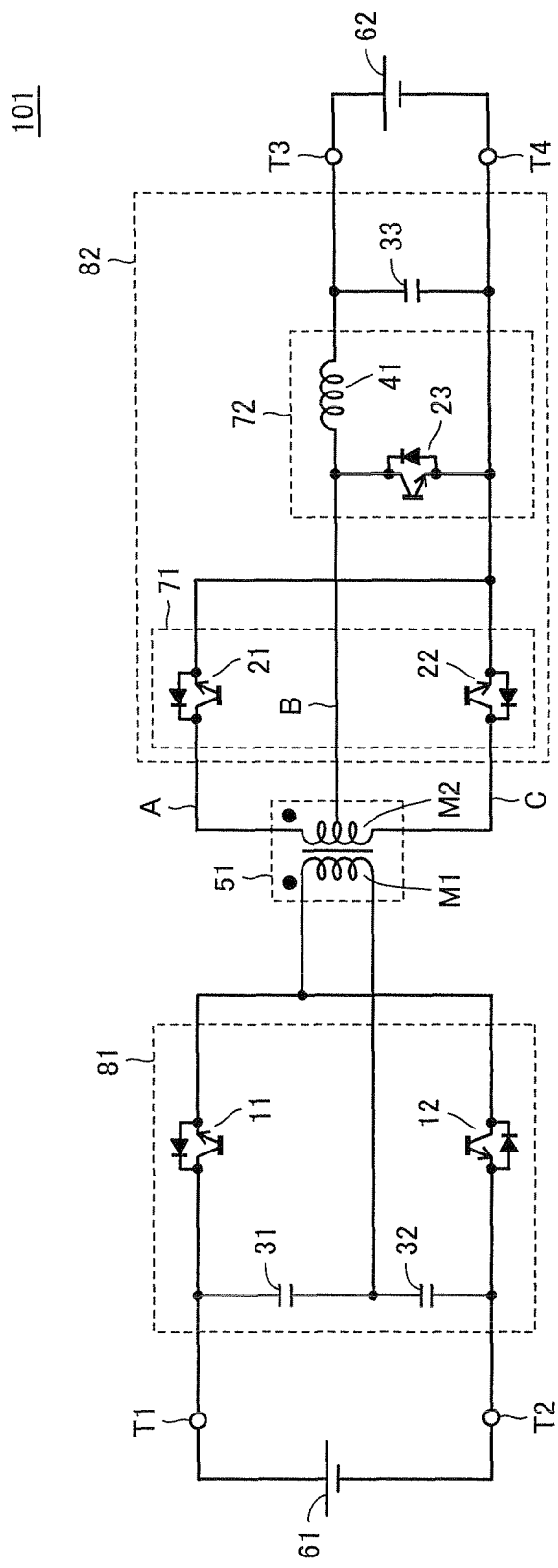
FIG. 2 is a diagram showing a configuration of a bidirectional DC/DC converter according to the first embodiment of the present invention.

FIG. 2 is a diagram showing a configuration of a bidirectional DC/DC converter according to the first embodiment of the present invention.

Referring to FIG. 2, bidirectional DC/DC converter 101 includes voltage terminals T1 to T4, a first bidirectional DC/AC conversion circuit 81, an isolation transformer 51, and a second bidirectional DC/AC conversion circuit 82. First bidirectional DC/AC conversion circuit 81 is implemented, for example, by a half-bridge circuit, and it includes switching elements 11 and 12 and capacitors 31 and 32. Isolation transformer 51 includes a primary winding M1 and a secondary winding M2. Second bidirectional DC/AC conversion circuit 82 includes a push-pull circuit 71, an up-conversion circuit 72, and a smoothing capacitor 33. Push-pull circuit 71 includes switching elements 21 and 22. Up-conversion circuit 72 includes a coil (an inductor) 41 and a switching element 23.

Hereinafter, in bidirectional DC/DC converter 101, a side of a first DC power source 61 may be referred to as a primary side and a side of a second DC power source 62 may be referred to as a secondary side, with transformer 51 lying therebetween.

Switching elements 11 and 12 and switching elements 21 and 22 are each implemented, for example, by an IGBT (Insulated Gate Bipolar Transistor). A turns ratio of isolation transformer 51 is set, for example, to 1:1.

On the primary side, switching element 11 has a collector connected to a first end of capacitor 31 and voltage terminal T1 and an emitter connected to a first end of 1 winding M1. A cathode of a body diode of switching element 11 corresponds to the collector of switching element 11 and an anode thereof corresponds to the emitter of switching element 11. Switching element 12 has an emitter connected to a second end of capacitor 32 and voltage terminal T2 and a collector connected to the first end of 1 winding M1. A cathode of a body diode of switching element 12 corresponds to the collector of switching element 12 and an anode thereof corresponds to the emitter of switching element 12. A second end of capacitor 31 and a first end of capacitor 32 are connected to a second end of primary winding M1.

On the secondary side, switching element 21 has a collector connected to a first end of 2 winding M2 and an emitter connected to voltage terminal T4. A cathode of a body diode of switching element 21 corresponds to the collector of switching element 21 and an anode thereof corresponds to the emitter of switching element 21. Switching element 22 has a collector connected to a second end of 2 winding M2 and an emitter connected to voltage terminal T4. A cathode of a body diode of switching element 22 corresponds to the collector of switching element 22 and an anode thereof corresponds to the emitter of switching element 22. Coil 41 has a first end connected to a portion other than opposing ends (an intermediate point) of 2 winding M2 and a second end connected to voltage terminal T3. Switching element 23 has a collector connected to the first end of coil 41 and an emitter connected to voltage terminal T4. A cathode of a body diode of switching element 23 corresponds to the collector of switching element 23 and an anode thereof corresponds to the emitter of switching element 23. Smoothing capacitor 33 has a first end connected to voltage terminal T3 and a second end connected to voltage terminal T4.

First DC power source 61 corresponds to DC power source 302 shown in FIG. 1 and applies a DC voltage to voltage terminals T1 and T2 through unidirectional DC/DC converter 201. Second DC power source 62 corresponds to power storage device 303 shown in FIG. 1 and applies a DC voltage to voltage terminals T3 and T4. Namely, unidirectional DC/DC converter 201 and inverter 202 are connected to voltage terminals T1 and T2. Power storage device 303 is connected to voltage terminals T3 and T4.

Bidirectional DC/DC converter 101 performs a forward-direction operation for converting a DC voltage applied to voltage terminals T1 and T2 and supplying the DC voltage to voltage terminals T3 and T4 and a reverse-direction operation for converting a DC voltage applied to voltage terminals T3 and T4 and supplying the DC voltage to voltage terminals T1 and T2.

First bidirectional DC/AC conversion circuit 81 is connected between voltage terminals T1 and T2 and primary winding M1, converts a DC voltage applied to voltage terminals T1 and T2 to an AC voltage and outputs the AC voltage to primary winding M1 in the forward-direction operation, and rectifies and smoothes an AC voltage induced in primary winding M1 and outputs the AC voltage to voltage terminals T1 and T2 in the reverse-direction operation.

Second bidirectional DC/AC conversion circuit 82 is connected between voltage terminals T3 and T4 and secondary winding M2, rectifies and smoothes an AC voltage induced in secondary winding M2 and outputs the AC voltage to voltage terminals T3 and T4 in the forward-direction operation, and converts a DC voltage applied to voltage terminals T3 and T4 to an AC voltage and outputs the AC voltage to secondary winding M2 in the reverse-direction operation.

[Forward-Direction Operation]

The forward-direction operation of bidirectional DC/DC converter 101 will be described hereinafter.

Figure 3:
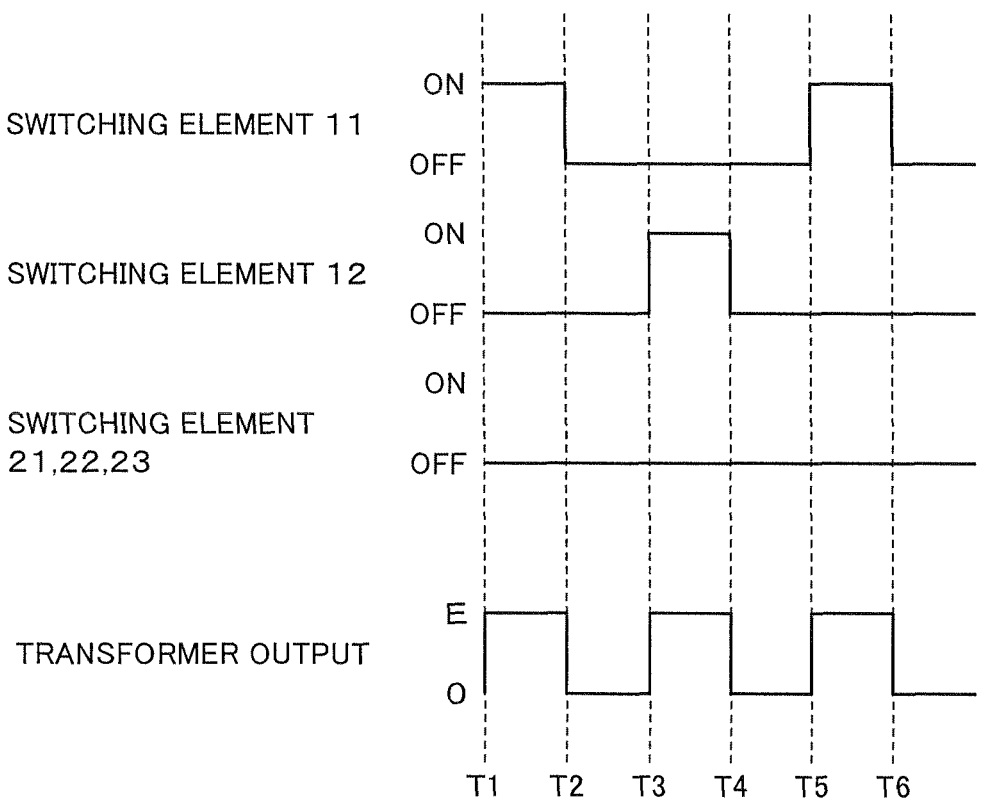
FIG. 3 is a diagram showing switching control in a forward-direction operation of the bidirectional DC/DC converter according to the first embodiment of the present invention.

FIG. 3 is a diagram showing switching control in the forward-direction operation of the bidirectional DC/DC converter according to the first embodiment of the present invention.

Referring to FIG. 3, in the forward-direction operation, switching elements 21 to 23 are all turned off.

Initially, when switching element 12 is turned off and switching element 11 is turned on, a current loop through switching element 11, primary winding M1 of transformer 51 and capacitor 32 is formed so that electric power supplied by first DC power source 61 is transmitted to the secondary side. On the secondary side, an AC voltage induced in secondary winding M2 is rectified by the body diode of switching element 22 and smoothed by smoothing capacitor 33, and the AC voltage is supplied to voltage terminal T3 and voltage terminal T4. During this period of time, switching element 22 may perform synchronous rectification (timing T1).

Then, when switching element 11 is turned off, power supply from the primary side to the secondary side is stopped (timing T2).

Then, when switching element 12 is turned on, a current loop through capacitor 31, primary winding M1 of transformer 51 and switching element 12 is formed so that electric power supplied by first DC power source 61 is transmitted to the secondary side. On the secondary side, an AC voltage induced in secondary winding M2 is rectified by the body diode of switching element 21 and smoothed by smoothing capacitor 33, and the AC voltage is supplied to voltage terminal T3 and voltage terminal T4. During this period of time, switching element 21 may perform synchronous rectification (timing T3).

Then, when switching element 12 is turned off, power supply from the primary side to the secondary side is stopped (timing T4). Bidirectional DC/DC converter 101 then repeats the operation from timing T1 to T4 (timing T5).

[Reverse-Direction Operation]

Before explaining the reverse-direction operation of bidirectional DC/DC converter 101, a voltage applied to switching elements 21 and 22 in an example where the bidirectional DC/DC converter according to the first embodiment of the present invention is assumed as not having switching element 23 will be described.

Here, an output voltage of first DC power source 61 is set to 400 V, an output voltage from second DC power source 62 is set to 200 V, and a turns ratio of transformer 51 is set to 1:1. In addition, the description will be simplified, for example, by ignoring slight voltage fluctuation.

Initially, in the forward-direction operation in which electric power is supplied from the primary side to the secondary side, since first bidirectional DC/AC conversion circuit 81 on the primary side is a half-bridge circuit, a voltage applied to each of capacitors 31 and 32 is 200 V and a voltage applied to primary winding M1 of transformer 51 is also 200 V. Here, since the turns ratio of transformer 51 is set to 1:1, a voltage of 200 V is applied across a node A, that is, the first end of secondary winding M2, and a node B, that is, an intermediate point of secondary winding M2, and a voltage of 200 V is applied across a node C, that is, the second end of secondary winding M2, and node B. Therefore, a voltage of 400 V is applied across node A and node C, and a voltage of 400 V is also applied to switching elements 21 and 22 that serve to prevent this application.

Then, in the reverse-direction operation in which electric power is supplied from the secondary side to the primary side, energy is stored in coil 41 while switching elements 21 and 22 are both turned on. Then, when any one of switching elements 21 and 22 is turned off, electric power is transmitted to the primary side. Therefore, since a period during which both of switching elements 21 and 22 are turned on and electric power is not transmitted to the primary side and a period during which any one of switching elements 21 and 22 is turned off and electric power is transmitted to the primary side are present, a voltage not lower than 400 V for application to the primary side is absolutely necessary during a period in which electric power is transmitted to the primary side. Though a voltage to be applied to the primary side is affected by a duty ratio of switching, a voltage of substantially approximately 600 V is considered as necessary and hence switching elements 21 and 22 are also required to have a withstand voltage corresponding to this 600 V. In particular, taking into account a transient voltage at the moment of switching, a switching element having further higher withstand voltage should inevitably be used.

The bidirectional DC/DC converter according to the first embodiment of the present invention, however, solves the above-described problem by including switching element 23. The reverse-direction operation of bidirectional DC/DC converter 101 will be described hereinafter.

Figure 4:
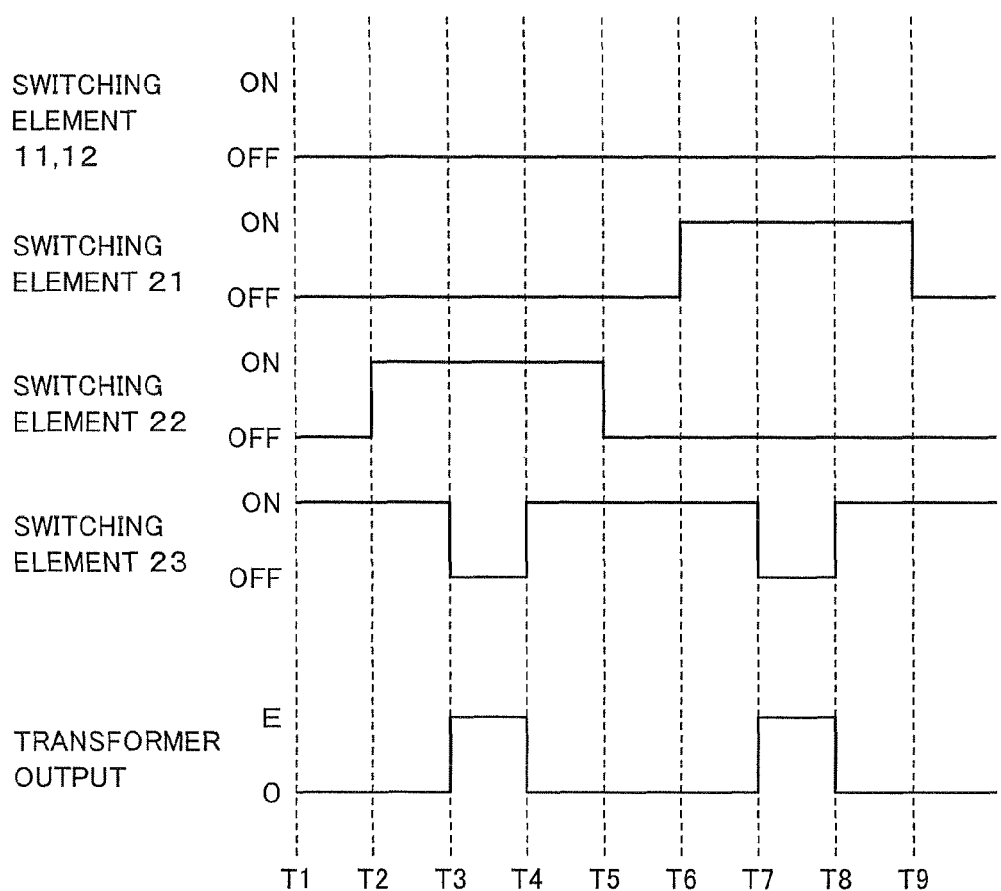
FIG. 4 is a diagram showing switching control in a reverse-direction operation of the bidirectional DC/DC converter according to the first embodiment of the present invention.

FIG. 4 is a diagram showing switching control in the reverse-direction operation of the bidirectional DC/DC converter according to the first embodiment of the present invention.

Referring to FIG. 4, in the reverse-direction operation, switching elements 11 and 12 are both turned off.

[Energy Storage Operation 1 of Coil 41]

Initially, when switching elements 21 and 22 are turned off and switching element 23 is turned on, second DC power source 62 starts to cause coil 41 to store electric power (timing T1).

Then, switching element 22 is turned on. Here, a voltage from second DC power source 62 is all applied to coil 41. Therefore, no voltage is applied to switching element 22, that is, switching element 22 achieves zero-voltage switching. During this period of time as well, energy is being stored in coil 41 (timing T2).

[Operation 1 for Supplying Up-Converted Electric Power to First DC Power Source 61]

Then, when switching element 23 is turned off, energy stored in coil 41 is supplied through transformer 51 to voltage terminal T1 and voltage terminal T2. More specifically, on the primary side, an AC voltage induced in primary winding M1 is rectified by the body diode of switching element 11 and smoothed by capacitor 32, and the AC voltage is supplied to voltage terminal T1 and voltage terminal T2. Namely, a current in first bidirectional DC/AC conversion circuit 81 passes through the body diode of switching element 11 and capacitor 32 and it is supplied to voltage terminal T1 and voltage terminal T2. When the current flows to the body diode of switching element 11, switching element 11 may perform synchronous rectification (timing T3).

[Energy Storage Operation 2 of Coil 41]

Then, when switching element 23 is turned on, second DC power source 62 starts to cause coil 41 to store electric power (timing T4).

Then, switching element 22 is turned off. Here, a current path through which a current flows sequentially from second DC power source 62 to coil 41 and switching element 23 is formed. Therefore, no current flows through switching element 22. Namely, switching element 22 achieves zero-current switching. During this period of time as well, energy is being stored in coil 41 (timing T5).

Then, switching element 21 is turned on. Here, a voltage from second DC power source 62 is all applied to coil 41. Therefore, switching element 21 achieves zero-voltage switching. During this period of time as well, energy is being stored in coil 41 (timing T6).

[Operation 2 for Supplying Up-Converted Electric Power to First DC Power Source 61]

Then, when switching element 23 is turned off, energy stored in coil 41 is supplied through transformer 51 to voltage terminal T1 and voltage terminal T2. More specifically, on the primary side, an AC voltage induced in primary winding M1 is rectified by the body diode of switching element 12 and smoothed by capacitor 31, and the AC voltage is supplied to voltage terminal T1 and voltage terminal T2. Namely, a current in first bidirectional DC/AC conversion circuit 81 passes through the body diode of switching element 12 and capacitor 31 and it is supplied to voltage terminal T1 and voltage terminal T2. When the current flows to the body diode of switching element 12, switching element 12 may perform synchronous rectification (timing T7).

[Energy Storage Operation 3 of Coil 41]

Then, when switching element 23 is turned on, second DC power source 62 starts to cause coil 41 to store electric power (timing T8).

Then, switching element 21 is turned off. Here, a current path through which a current flows sequentially from second DC power source 62 to coil 41 and switching element 23 is formed. Therefore, no current flows through switching element 21. Namely, switching element 21 achieves zero-current switching (timing T9). Then, bidirectional DC/DC converter 101 repeats the operation from timing T1 to T9.

In the bidirectional DC/DC converter described in Patent Document 1, since a transient voltage applied to a switching element is great, a switching element having high withstand voltage should be selected. Thus, disadvantageously, efficiency of the bidirectional DC/DC converter lowers due to increase in an ON resistance and a heat sink for waste heat disposal of the switching element increases in size.

In the bidirectional DC/DC converter according to the first embodiment of the present invention, however, switching element 23 for forming a current path sequentially going through voltage terminal T3, coil 41 and voltage terminal T4 but not through switching element 21 and switching element 22 as it is turned on is provided within up-conversion circuit 72. Then, when electric power is supplied from second DC power source 62 to voltage terminal T1 and voltage terminal T2, switching elements 21 and 22 within push-pull circuit 71 are turned on and off while switching element 23 is turned on and energy is being stored in coil 41, to thereby achieve zero-voltage switching and zero-current switching.

Thus, switching loss in switching elements 21 and 22 can be reduced and a voltage applied to switching elements 21 and 22 ideally becomes zero. Therefore, with regard to switching elements 21 and 22, a withstand voltage in supplying electric power from first DC power source 61 to voltage terminal T3 and voltage terminal T4 should only be taken into account, a switching element having low withstand voltage can be used, and consequently an ON resistance of switching element 21 and 22 element can be lowered. When electric power is supplied from second DC power source 62 to voltage terminal T1 and voltage terminal T2, a current unexceptionally flows through switching elements 21 and 22 within push-pull circuit 71, so that loss caused when electric power passes through switching elements 21 and 22 decreases and efficiency of bidirectional DC/DC converter 101 can be improved. In addition, with decrease in the ON resistance of switching elements 21 and 22, an amount of exhaust heat from switching elements 21 and 22 decreases and a heat sink can be reduced in size.

In addition, in the bidirectional DC/DC converter according to the first embodiment of the present invention, a half-bridge circuit is employed as first bidirectional DC/AC conversion circuit 81. According to such a configuration, a voltage difference between first DC power source 61 and second DC power source 62 is approximately doubled. In such an example where a difference between a voltage of first DC power source 61 and a voltage of second DC power source 62 is great, an effect achieved by the bidirectional DC/DC converter including up-conversion circuit 72 according to the first embodiment of the present invention is significant.

Moreover, smoothing capacitor 33 achieves an effect of smoothing electric power in the forward-direction operation, and generally an electrolytic capacitor having high capacity should be employed. Here, if second DC power source 62 is a secondary battery, this secondary battery can also serve as smoothing capacitor 33. Therefore, the need for smoothing capacitor 33 can be obviated, or a capacitor of low capacity can be employed.

Though a half-bridge circuit is employed as first bidirectional DC/AC conversion circuit 81 in the bidirectional DC/DC converter according to the first embodiment of the present invention, the present invention is not limited as such. A general circuit used in a DC/DC converter, such as a full-bridge circuit, may be employed. In addition, depending on a voltage difference between first DC power source 61 and second DC power source 62, a turns ratio of isolation transformer 51 may be varied.

Further, by adjusting a time period for storage of energy in coil 41 and a time period for supply of up-converted electric power to first DC power source 61, a level of a voltage to be supplied to voltage terminal T1 and voltage terminal T2 can be controlled.

Another embodiment of the present invention will now be described with reference to the drawings. In the drawings, the same or corresponding elements have the same reference characters allotted and description thereof will not be repeated.

Second Embodiment

The present embodiment relates to a bidirectional DC/DC converter additionally including a protection circuit, as compared with the bidirectional DC/DC converter according to the first embodiment.

Figure 5:
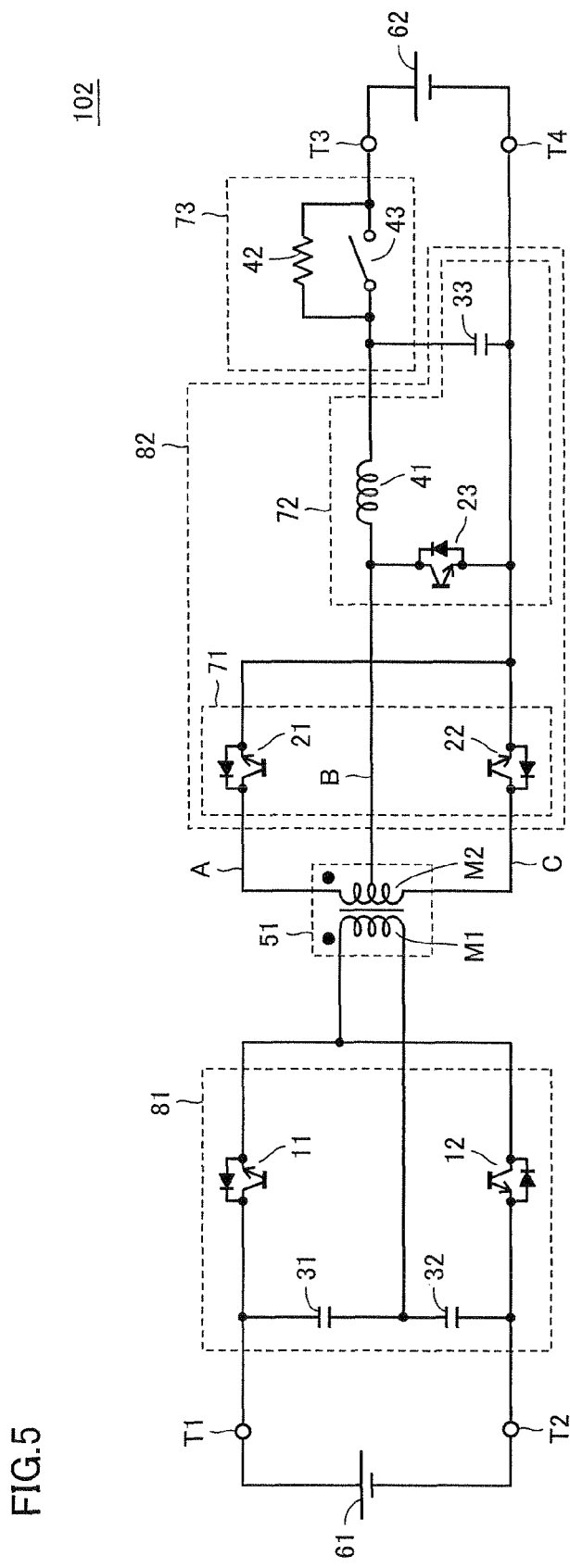
FIG. 5 is a diagram showing a configuration of a bidirectional DC/DC converter according to a second embodiment of the present invention.

FIG. 5 is a diagram showing a configuration of the bidirectional DC/DC converter according to the second embodiment of the present invention.

Referring to FIG. 5, a bidirectional DC/DC converter 102 further includes an inrush current prevention circuit 73, as compared with the bidirectional DC/DC converter according to the first embodiment of the present invention. Inrush current prevention circuit 73 includes a resistor 42 and a switching element 43 connected in parallel between the second end of coil 41, the first end of smoothing capacitor 33 and voltage terminal T3.

In an initial state, that is, immediately after power-on of bidirectional DC/DC converter 102, charges have not yet been stored in smoothing capacitor 33 within bidirectional DC/DC converter 102. Therefore, if second DC power source 62 such as a battery is connected to voltage terminals T3 and T4, a short-circuited state is caused and an inrush current flows from second DC power source 62 to bidirectional DC/DC converter 102.

Therefore, in the initial state, switch 43 of inrush current prevention circuit 73 is turned off and electric power is supplied to smoothing capacitor 33 through resistor 42. After a certain period of time elapsed, that is, after a period of time for storing sufficient charges in smoothing capacitor 33 elapsed, switch 43 is turned on and transition to a normal operation is made. According to such a configuration, flow of an inrush current from second DC power source 62 to bidirectional DC/DC converter 102 can be prevented.

As other configurations and operations are the same as those in the bidirectional DC/DC converter according to the first embodiment, detailed description will not be repeated here.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 11, 12, 21, 22, 23 switching element; 31, 32 capacitor; 33 smoothing capacitor; 41 coil (inductor); 42 resistor; 43 switching element; 51 isolation transformer; 71 push-pull circuit; 72 up-conversion circuit; 73 inrush current prevention circuit; 81 first bidirectional DC/AC conversion circuit; 82 second bidirectional DC/AC conversion circuit; 101 bidirectional DC/DC converter; 201 unidirectional DC/DC converter; 202 inverter; 301 power conditioner; 304 power system; T1 to T4 voltage terminal; M1 primary winding; and M2 secondary winding.

The invention claimed is:

1. A bidirectional DC/DC converter including a first voltage terminal to a fourth voltage terminal, and performing a forward-direction operation for converting a DC voltage applied to said first voltage terminal and a second voltage terminal to a prescribed DC voltage and supplying the DC voltage to a third voltage terminal and said fourth voltage terminal and a reverse-direction operation for converting a DC voltage applied to said third voltage terminal and said fourth voltage terminal to a prescribed DC voltage and supplying the DC voltage to said first voltage terminal and said second voltage terminal, comprising:
an isolation transformer including a first winding and a second winding;
a first bidirectional DC/AC conversion circuit connected between said first voltage terminal, said second voltage terminal and said first winding, for converting the DC voltage applied to said first voltage terminal and said second voltage terminal to an AC voltage and outputting the AC voltage to said first winding in said forward-direction operation, and rectifying and smoothing an AC voltage induced in said first winding and outputting the AC voltage to said first voltage terminal and said second voltage terminal in said reverse-direction operation; and
a second bidirectional DC/AC conversion circuit connected between said third voltage terminal, said fourth voltage terminal and said second winding, for rectifying and smoothing an AC voltage induced in said second winding and outputting the AC voltage to said third voltage terminal and said fourth voltage terminal in said forward-direction operation, and converting the DC voltage applied to said third voltage terminal and said fourth voltage terminal to an AC voltage and outputting the AC voltage to said second winding in said reverse-direction operation,
said second bidirectional DC/AC conversion circuit including
a push-pull circuit including a first switching element and a second switching element coupled to opposing ends of said second winding respectively, and
an up-conversion circuit coupled to said push-pull circuit, said third voltage terminal and said fourth voltage terminal, said up-conversion circuit including
an inductor for allowing passage of a current through said second winding, said first switching element in an ON state and said second switching element in an ON state owing to stored magnetic energy, and
a third switching element forming a current path going through said third voltage terminal, said inductor and said fourth voltage terminal but not through said first switching element and said second switching element as it is turned on, and
in said reverse-direction operation, said third switching element repeating an ON state and an OFF state, and the ON state and the OFF state of said first switching element and said second switching element being switched while said third switching element is in the ON state.

2. The bidirectional DC/DC converter according to claim 1, wherein
said inductor has a first end connected to a portion other than the opposing ends of said second winding and a second end connected to said third voltage terminal,
said first switching element has a first end connected to a first end of said second winding and a second end connected to said fourth voltage terminal,
said second switching element has a first end connected to a second end of said second winding and a second end connected to said fourth voltage terminal, and
said third switching element has a first end connected to the first end of said inductor and a second end connected to said fourth voltage terminal.

3. The bidirectional DC/DC converter according to claim 2, wherein in said reverse-direction operation, said first switching element is turned on while said third switching element is in the ON state and said second switching element is in the OFF state, said third switching element is turned off after a prescribed period of time elapsed since turn-on of said first switching element, said third switching element is turned on after a prescribed period of time elapsed since turn-off of said third switching element, said first switching element is turned off after a prescribed period of time elapsed since turn-on of said third switching element, said second switching element is turned on after a prescribed period of time elapsed since turn-off of said first switching element, said third switching element is turned off after a prescribed period of time elapsed since turn-on of said second switching element, said third switching element is turned on after a prescribed period of time elapsed since turn-off of said third switching element, and said second switching element is turned off after a prescribed period of time elapsed since turn-on of said third switching element.

4. The bidirectional DC/DC converter according to claim 1, wherein
said first bidirectional DC/AC conversion circuit includes a half-bridge circuit.

5. The bidirectional DC/DC converter according to claim 1, wherein
said first bidirectional DC/AC conversion circuit includes
a fourth switching element having a body diode and connected between a first end of said first winding and said first voltage terminal, and
a fifth switching element having a body diode and connected in parallel to said fourth switching element, between the first end of said first winding and said second voltage terminal, and
in said forward-direction operation, said fourth switching element and said fifth switching element are turned on and off, in said reverse-direction operation, said fourth switching element and said fifth switching element are both turned off, and a current induced in said first winding is rectified by the body diode of said fourth switching element and the body diode of said fifth switching element.

6. The bidirectional DC/DC converter according to claim 1, wherein
said first switching element and said second switching element each have a body diode, and
in said reverse-direction operation, said first switching element and said second switching element are turned on and off, in said forward-direction operation, said first switching element and said second switching element are both turned off, and a current induced in said second winding is rectified by the body diode of said first switching element and the body diode of said second switching element.

7. The bidirectional DC/DC converter according to claim 1, wherein
a secondary battery is coupled to said third voltage terminal and said fourth voltage terminal.

8. The bidirectional DC/DC converter according to claim 1, wherein
said second bidirectional DC/AC conversion circuit further includes a smoothing capacitor connected between said third voltage terminal and said fourth voltage terminal, and
said bidirectional DC/DC converter further comprises an inrush current prevention circuit connected between said smoothing capacitor, said inductor and said third voltage terminal, for preventing an inrush current by the DC voltage applied to said third voltage terminal and said fourth voltage terminal.

9. The bidirectional DC/DC converter according to claim 1, wherein
in said reverse-direction operation, said first switching element is turned on while said third switching element is in the ON state and said second switching element is in the OFF state, said third switching element is turned off after a prescribed period of time elapsed since turn-on of said first switching element, said third switching element is turned on after a prescribed period of time elapsed since turn-off of said third switching element, said first switching element is turned off after a prescribed period of time elapsed since turn-on of said third switching element, said second switching element is turned on after a prescribed period of time elapsed since turn-off of said first switching element, said third switching element is turned off after a prescribed period of time elapsed since turn-on of said second switching element, said third switching element is turned on after a prescribed period of time elapsed since turn-off of said third switching element, and said second switching element is turned off after a prescribed period of time elapsed since turn-on of said third switching element.

10. A power conditioner coupled to a DC power source, a power storage device and a power system, interconnected to said power system, and supplying electric power to a load, comprising:

a unidirectional DC/DC converter for converting a DC voltage received from said DC power source to a prescribed DC voltage and outputting the DC voltage;
a bidirectional DC/DC converter for performing a forward-direction operation for converting a DC voltage received from said unidirectional DC/DC converter to a prescribed DC voltage and supplying the DC voltage to said power storage device during charging of said power storage device and performing a reverse-direction operation for converting a DC voltage received from said power storage device to a prescribed DC voltage and outputting the DC voltage during discharging of said power storage device; and
an inverter for converting a DC voltage received from said unidirectional DC/DC converter and said bidirectional DC/DC converter to an AC voltage and supplying the AC voltage to said load,
said bidirectional DC/DC converter including
an isolation transformer including a first winding and a second winding,
a first bidirectional DC/AC conversion circuit connected between said unidirectional DC/DC converter, said inverter and said first winding, for converting the DC voltage received from said unidirectional DC/DC converter to an AC voltage and outputting the AC voltage to said first winding in said forward-direction operation and rectifying and smoothing an AC voltage induced in said first winding and outputting the AC voltage to said inverter in said reverse-direction operation, and
a second bidirectional DC/AC conversion circuit connected between said power storage device and said second winding, for rectifying and smoothing an AC voltage induced in said second winding and outputting the AC voltage to said power storage device in said forward-direction operation and converting the DC voltage received from said power storage device to an AC voltage and outputting the AC voltage to said second winding in said reverse-direction operation,
said second bidirectional DC/AC conversion circuit including
a push-pull circuit including a first switching element and a second switching element coupled to opposing ends of said second winding respectively, and
an up-conversion circuit coupled to said push-pull circuit and said power storage device,
said up-conversion circuit including
an inductor for allowing passage of a current through said second winding, said first switching element in an ON state and said second switching element in an ON state owing to stored magnetic energy, and
a third switching element forming a current path going through said power storage device and said inductor but not through said first switching element and said second switching element as it is turned on, and
in said reverse-direction operation, said third switching element repeating an ON state and an OFF state, and the ON state and the OFF state of said first switching element and said second switching element being switched while said third switching element is in the ON state.

* * * * *